(12) United States Patent
Koo et al.

(10) Patent No.: US 11,997,128 B2
(45) Date of Patent: May 28, 2024

(54) METHOD AND APPARATUS FOR PREDICTING ATTACK VULNERABILITY OF COMPUTER NETWORK

(71) Applicant: ELECTRONICS AND TELECOMMUNICATIONS RESEARCH INSTITUTE, Daejeon (KR)

(72) Inventors: Ki Jong Koo, Daejeon (KR); Dae Sung Moon, Daejeon (KR); Jooyoung Lee, Daejeon (KR); Ik Kyun Kim, Daejeon (KR); Kyungmin Park, Daejeon (KR); Ho Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 338 days.

(21) Appl. No.: 17/394,989

(22) Filed: Aug. 5, 2021

(65) Prior Publication Data
US 2022/0046048 A1    Feb. 10, 2022

(30) Foreign Application Priority Data
Aug. 6, 2020    (KR) .......................... 10-2020-0098708

(51) Int. Cl.
*H04L 29/06*    (2006.01)
*G06F 9/455*    (2018.01)
(Continued)

(52) U.S. Cl.
CPC .......... *H04L 63/1433* (2013.01); *G06F 9/455* (2013.01); *G06N 3/08* (2013.01); *G06N 5/046* (2013.01)

(58) Field of Classification Search
USPC .......................................................... 726/25
See application file for complete search history.

(56) References Cited

U.S. PATENT DOCUMENTS

| 11,048,765 B1 * | 6/2021 | Paiz ..................... G06F 16/335 |
| 2014/0090061 A1 * | 3/2014 | Avasarala ............. G06F 21/566 |
| | | 726/24 |

(Continued)

FOREIGN PATENT DOCUMENTS

| KR | 10-2018-0007832 | 1/2018 |
| KR | 10-1814368 | 1/2018 |

(Continued)

OTHER PUBLICATIONS

Joo Yeon Moon et al., 'An Attack Graph Model for Dynamic Network Environment', Journal of The Korea Institute of Information Security & Cryptology, vol. 28, No. 2, pp. 485-500, Apr. 30, 2018.

*Primary Examiner* — Sanchit K Sarker
(74) *Attorney, Agent, or Firm* — KILE PARK REED & HOUTTEMAN

(57) ABSTRACT

Collecting the topology and asset information of the virtual generated computer network, converting the topology and asset information into a training data set for training the neural network model, training the neural network model based on the training data set, and training A method and apparatus for predicting an attack vulnerability of a computer network through the step of inferring an attack vulnerability of a target computer network using a neural network model are provided.

15 Claims, 27 Drawing Sheets

(51) Int. Cl.
*G06N 3/08* (2023.01)
*G06N 5/046* (2023.01)
*H04L 9/40* (2022.01)

(56) References Cited

U.S. PATENT DOCUMENTS

| | | | |
|---|---|---|---|
| 2016/0057164 A1 | 2/2016 | Maeng et al. | |
| 2017/0017793 A1* | 1/2017 | Davis | G06N 3/08 |
| 2018/0060580 A1* | 3/2018 | Zhao | G06N 20/20 |
| 2018/0337938 A1* | 11/2018 | Kneib | H04L 63/0876 |
| 2019/0052663 A1 | 2/2019 | Lee et al. | |
| 2021/0311774 A1* | 10/2021 | Wei | G06F 11/3006 |

FOREIGN PATENT DOCUMENTS

| | | |
|---|---|---|
| KR | 10-1847965 | 4/2018 |
| KR | 10-2006553 | 8/2019 |

\* cited by examiner

FIG. 4

```
"routers": [
  {
    "defaultgw": "192.168.1.1",
    "interfaces": [
      {
        "ip_address": "192.168.10.1",
        "mask": "255.255.255.0"
      },
      {
        "ip_address": "192.168.20.1",
        "mask": "255.255.255.0"
      }
    ],
    "type": "router",
    "name": "router_name_R_0"
  }
]
```

```
"topology": {
  "subnets": [
    {
      "defaultgw": "192.168.10.1",
      "node": [
        {
          "defaultgw": "192.168.10.1",
          "interfaces": [
            {
              "ip_address": "192.168.10.2",
              "dnsname": "Unspecified",
              "speed": "Unspecified",
              "mask": "255.255.255.0"
            }
          ],
          "type": "host",
          "name": "h_r0_s0_0-192.168.10.2"
        }
      ],
      "netmask": "255.255.255.0",
      "id": "subnet_192.168.10.0",
      "netid": "192.168.10.0"
    }
  ],
  "links": [
    {
      "dstnode": "router_name_R_0",
      "srcnode": "h_r0_s0_0-192.168.10.2",
      "dstif": "192.168.10.1",
      "id": "link-h_r0_s0_0-192.168.10.0-router_name_R_0",
      "srcif": "192.168.10.2"
    },
    {
      "dstnode": "router_name_R_0",
      "srcnode": "h_r0_s0_0-192.168.10.3",
      "dstif": "192.168.10.1",
      "id": "link-h_r0_s0_1-192.168.10.3-router_name_R_0",
      "srcif": "192.168.10.3"
    }
  ]
}
```

```
{
  "timestamp": "2019_8_5_6_9_27",
  "system_states": [
    {
      "system_name": "h_r0_s0_0-192.168.10.2",
      "processes": [
        {
          "product": "netware",
          "version": "",
          "vendor": "novell",
          "cpe_2.3": "cpe:/o:novell:netware"
        }
      ],
      "operating_system": {
        "product": "IOS",
        "cpe_2.3": "cpe:/o:IOS"
      },
      "reachabilitys": [],
      "system_id": "h_r0_s0_0-192.168.10.2",
      "services": [
        {
          "services_id": "afpovertcp",
          "protocol": "tcp",
          "port": 548
        }
      ],
      "networks": [
        {
          "subnet_mask": "255.255.255.0",
          "default_router": "192.168.10.1",
          "ip_address": "192.168.10.2",
          "mac_address": "26:25:5e:58:81:7f"
        }
      ],
      "softwares": []
    }
  ]
}
```

FIG. 7

| Topology_ID | Num_hosts | Num_type_OS | Num_type_service | List_hosts | Connectivity_matrix |
|---|---|---|---|---|---|
| t_0 | 4 | 3 | 12 | ['192.168.20.6', '192.168.30.2', '192.168.30.3', '192.168.40.2'] | [1, 1, 1, 0, 1, 1, 1, 1, 1, 1, 1, 0, 1, 1, 1] |
| t_1 | 12 | 11 | 19 | ['192.168.30.2', '192.168.30.3', '192.168.30.4', '192.168.30.5', 'ro... | [0, 1, 1, 1, 0, 0, 0, 0, 0, 1, 0, 1, 1, 1, 0... |

FIG. 8

| | H1 | H2 | H3 | H4 | | H1 | H2 | H3 | H4 | | H1 | H2 | H3 | H4 | | H1 | H2 | H3 | H4 |
|---|---|---|---|---|---|---|---|---|---|---|---|---|---|---|---|---|---|---|---|
| H1 | 1 | 1 | 1 | 0 | H2 | 1 | 1 | 1 | 1 | H3 | 1 | 1 | 1 | 1 | H4 | 0 | 1 | 1 | 1 |

FIG. 9

| Topology_ID | MACaddr | IPaddr | OS | Service | Protocol | Port | Product |
|---|---|---|---|---|---|---|---|
| t_0 | 52:86:ca:c3:9e:ce | 192.168.20.6 | VxWorks | iso-tsap | tcp | 102 | simatic_cp_443_1 |
| t_0 | 52:86:ca:c3:9e:ce | 192.168.20.6 | VxWorks | iso-tsap | tcp | 102 | simatic_s7-300_cpu_firmware |
| t_0 | 7e:8e:d:83:2b:d4 | 192.168.40.6 | Ubuntu_8 | apex | tcp | 912 | realwin |
| t_0 | 7e:8e:d:83:2b:d4 | 192.168.40.6 | Ubuntu_8 | HTTPS | tcp | 443 | telepresence_system_software |
| t_0 | 7e:8e:d:83:2b:d4 | 192.168.40.6 | Ubuntu_8 | applicatio | tcp | 873 | big-ip_webaccelerator |
| t_0 | 7e:8e:d:83:2b:d4 | 192.168.40.6 | Ubuntu_8 | printer | tcp | 515 | acrobat_reader |
| t_1 | ed:f1:38:44:e7:d0 | 192.168.10.5 | Linux_kernel_3 | ipmi | udp | 623 | system_x3530_m4 |
| t_1 | ed:f1:38:44:e7:d0 | 192.168.10.5 | Linux_kernel_3 | HTTPS | tcp | 443 | dsl-n55u |
| t_1 | 3:a4:c6:5:e5:a6 | 192.168.10.2 | Debian_linux | SSH | tcp | 22 | netiron_ces_2024c-4x |
| t_1 | 3:a4:c6:5:e5:a6 | 192.168.10.2 | Debian_linux | ipmi | udp | 623 | system_x3400_m2 |
| t_1 | 3:a4:c6:5:e5:a6 | 192.168.10.2 | Debian_linux | afpovertcp | tcp | 548 | netware |

FIG. 10

| Topology_ID | Start_node | End_node | Path | Score |
|---|---|---|---|---|
| t_0 | 192.168.40.4 | 192.168.40.5 | ['192. 168. 40. 4', '192. 168. 40. 5'] | 0.09611537 |
| t_0 | 192.168.40.5 | 192.168.40.4 | ['192. 168. 40. 5', '192. 168. 40. 4'] | 0.09611537 |
| t_0 | 192.168.40.2 | 192.168.40.3 | ['192. 168. 40. 2', '192. 168. 40. 3'] | 0.09268937 |
| t_0 | 192.168.40.3 | 192.168.40.2 | ['192. 168. 40. 3', '192. 168. 40. 2'] | 0.09268937 |
| t_0 | 192.168.40.4 | 192.168.40.3 | ['192. 168. 40. 4', '192. 168. 40. 3'] | 0.07665768 |
| t_0 | 192.168.40.3 | 192.168.40.4 | ['192. 168. 40. 3', '192. 168. 40. 4'] | 0.07665768 |

FIG. 12

| topo_ip | os | sv |
|---|---|---|
| t_0001-192.168.10.2 | 29 | [{8}] |
| t_0001-192.168.10.3 | 60 | [{39, 33, 17}] |
| t_0001-192.168.10.4 | 42 | [{28, 11}] |
| t_0001-192.168.20.2 | 4 | [{2, 26, 28}] |
| t_0001-192.168.20.3 | 24 | [{17}] |
| t_0001-192.168.20.4 | 65 | [{30, 28}] |
| t_0001-192.168.30.2 | 64 | [{4, 4, 28}] |
| ... | ... | ... |
| t_0001-192.168.50.3 | 15 | [{28, 4, 17}] |
| t_0001-192.168.50.4 | 35 | [{28}] |
| t_0001-192.168.60.2 | 62 | [{4}] |
| t_0001-192.168.60.3 | 56 | [{28}] |
| t_0001-192.168.60.4 | 60 | [{8, 10, 25}] |
| t_0001-192.168.60.5 | 48 | [{11, 4}] |
| t_0001-192.168.60.6 | 56 | [{10}] |

FIG. 18

```
1   import sys, os
2   sys.path.append(os.pardir)
3   import numpy as np
4   import pandas as pd
5   import matplotlib.pyplot as plt
6
7   import iag_train_preprocessor as iprep
8
9
10
11  # Conditions
12  LABEL_TO_ONE = True
13  np.random.seed(999)
14
15
16
17  ############################
18  # LOADING IAG LEARNING DATA
19  ############################
20  train_num = 80000
21  # 'train_num' IS USED AS TRAINING DATA, AND THE REST IS USED AS TEST DATA
22  # 'x_train' IS A NORMALIZED REPRESENTAION OF THE NUMBER OF OS/SVC
23  # 't_train' IS A FLOATING-POINT ATTACK SCORE → THEREFORE,
            NEED TO BE CHANGED TO A LABEL OF 0/1
24  # 'x_test' IS USED WHEN TESTING USING THE TRAINED MODEL
25  (x_train, t_train), (x_test, t_test) = iprep.load_iag_dataset_normalized(train_num)
26
27  if LABEL_TO_ONE: # SET CORRECT POSITION VALUE (ATTACK SCORE) OF apm TO 1..
        (THAT IS, THE LABEL ONE-HOT SCHEME IS APPLIED)
28      t_train[t_train.nonzero( ) ] = 1.
29      t_test[t_test.nonzero( ) ] = 1.
30
```

FIG. 19

```
33  #############################
34  # CREATE NEURAL NETWORK MODEL
35  #############################
36
37  from keras import models
38  from keras import layers
39
40  model = models.Sequential( )
41  model . add(layers.Dense(512, activation = 'relu', input_shape = (276,)))
42  model . add(layers.Dense(512, activation = 'relu'))
43  model . add(layers.Dense(276, activation = 'sigmoid'))
44
45  # SELECT A LOSS FUNCTION AND OPTIMIZER
46  model . compile(optimizer = 'rmsprop',
47                 # optimizer=keras.optimizer.Adam( )
48                 loss='binary_crossentropy',
49                 metrics=['accuracy'])
50
51
```

FIG. 20

```
54  ############################
55  # TRAINING AND VERIFICATION
56  ############################
57  x_val = x_train[:10000]
58  partial_x_train = x_train[10000:]
59  t_val = t_train[:10000]    # y == t
60  partial_t_train = t_train[10000:]
61
62
63  # CODE 3-8 TRAIN MODEL
64  # --------------------
65  # CREATE MINI-BATCH INCLUDING 512 SAMPLES AND
       TRAIN MODEL FOR 20 EPOCHS
66  # REPEAT 20 TIMES FOR ALL SAMPLES INCLUDED IN TENSORS OF
       X_TRAIN AND Y_TRAIN
67  # MEASURE SIMULTANEOUSLY LOSS AND ACCURACY ON 10,000
       SEPARATE SAMPLES
68  # TO DO THIS, TRANSFER VALIDATION DATA TO validation_data PARAMETER
69
70  history = model.fit(partial_x_train,
71                      partial_t_train,
72                      epochs=20,
73                      batch_size=512,
74                      validation_data=(x_val, t_val))
75
```

FIG. 21

```
77  # CODE 3-9 GRAPH A LOSS OF TRAINING AND VERIFICATION
78  # --------------------
79  import matplotlib.pyplot as plt
80
81  history_dict = history.history
82  loss = history_dict['loss']
83  val_loss = history_dict['val_loss']
84
85  epochs = range(1, len(loss) + 1)
86
87  plt.plot(epochs, loss, 'bo', label='Training loss') #'bo' BLUE DOT
88  plt.plot(epochs, val_loss, 'b', label='Validation loss')        # 'b' BLUE LINE
89  plt.title('Training and validation loss')
90  plt.xlabel('Epochs')
91  plt.ylabel('Loss')
92  plt.legend( )
93
94  #plt.show( )
95
96
97  # CODE 3-10 GRAPH A ACCURACY OF TRAINING AND VERIFICATION
98  # --------------------------
99  plt.clf( )    # INITIALIZE GRAPH
100 acc = history_dict['acc']
101 val_acc = history_dict['val_acc']
102
103 plt.plot(epochs, acc, 'bo', label='Training acc')
104 plt.plot(epochs, val_acc, 'b', label='Validation acc')
105 plt.title('Training and validation accuracy')
106 plt.xlabel('Epochs')
107 plt.ylabel('Accuracy')
108 plt.legend( )
109
110 #plt.show( )
```

FIG. 22

```
Train on 70000 samples, validate on 10000 samples
Epoch 1/20
70000/70000 [==============================] -2s 34us/step - loss: 0.0580 - acc: 0.9782 - val-loss: 0.0447 - val_acc: 0.9819
Epoch 2/20
70000/70000 [==============================] -2s 28us/step - loss: 0.0444 - acc: 0.9820 - val-loss: 0.0443 - val_acc: 0.9820
Epoch 3/20
70000/70000 [==============================] -2s 28us/step - loss: 0.0441 - acc: 0.9820 - val-loss: 0.0441 - val_acc: 0.9820
Epoch 4/20
70000/70000 [==============================] -2s 28us/step - loss: 0.0439 - acc: 0.9820 - val-loss: 0.0439 - val_acc: 0.9820
Epoch 5/20
70000/70000 [==============================] -2s 28us/step - loss: 0.0439 - acc: 0.9820 - val-loss: 0.0439 - val_acc: 0.9819
Epoch 6/20
70000/70000 [==============================] -2s 27us/step - loss: 0.0438 - acc: 0.9820 - val-loss: 0.0438 - val_acc: 0.9820
Epoch 7/20
70000/70000 [==============================] -2s 26us/step - loss: 0.0438 - acc: 0.9820 - val-loss: 0.0438 - val_acc: 0.9820
Epoch 8/20
70000/70000 [==============================] -2s 26us/step - loss: 0.0438 - acc: 0.9820 - val-loss: 0.0438 - val_acc: 0.9820
Epoch 9/20
70000/70000 [==============================] -2s 28us/step - loss: 0.0438 - acc: 0.9820 - val-loss: 0.0437 - val_acc: 0.9820
Epoch 10/20
70000/70000 [==============================] -2s 28us/step - loss: 0.0437 - acc: 0.9820 - val-loss: 0.0439 - val_acc: 0.9819
Epoch 11/20
70000/70000 [==============================] -2s 28us/step - loss: 0.0437 - acc: 0.9820 - val-loss: 0.0437 - val_acc: 0.9820
Epoch 12/20
70000/70000 [==============================] -2s 27us/step - loss: 0.0437 - acc: 0.9820 - val-loss: 0.0438 - val_acc: 0.9820
Epoch 13/20
70000/70000 [==============================] -2s 26us/step - loss: 0.0437 - acc: 0.9820 - val-loss: 0.0437 - val_acc: 0.9820
Epoch 14/20
70000/70000 [==============================] -2s 27us/step - loss: 0.0437 - acc: 0.9820 - val-loss: 0.0438 - val_acc: 0.9820
Epoch 15/20
70000/70000 [==============================] -2s 27us/step - loss: 0.0437 - acc: 0.9820 - val-loss: 0.0437 - val_acc: 0.9820
Epoch 16/20
70000/70000 [==============================] -2s 26us/step - loss: 0.0437 - acc: 0.9820 - val-loss: 0.0437 - val_acc: 0.9820
Epoch 17/20
70000/70000 [==============================] -2s 27us/step - loss: 0.0437 - acc: 0.9820 - val-loss: 0.0437 - val_acc: 0.9820
Epoch 18/20
70000/70000 [==============================] -2s 29us/step - loss: 0.0437 - acc: 0.9820 - val-loss: 0.0437 - val_acc: 0.9820
Epoch 19/20
70000/70000 [==============================] -2s 28us/step - loss: 0.0436 - acc: 0.9820 - val-loss: 0.0437 - val_acc: 0.9820
Epoch 20/20
70000/70000 [==============================] -2s 28us/step - loss: 0.0436 - acc: 0.9820 - val-loss: 0.0437 - val_acc: 0.9820
20000/20000 [==============================] -1s 29us/step
Prediction results:  [0.04368115025758743, 0.9819675662994385]
```

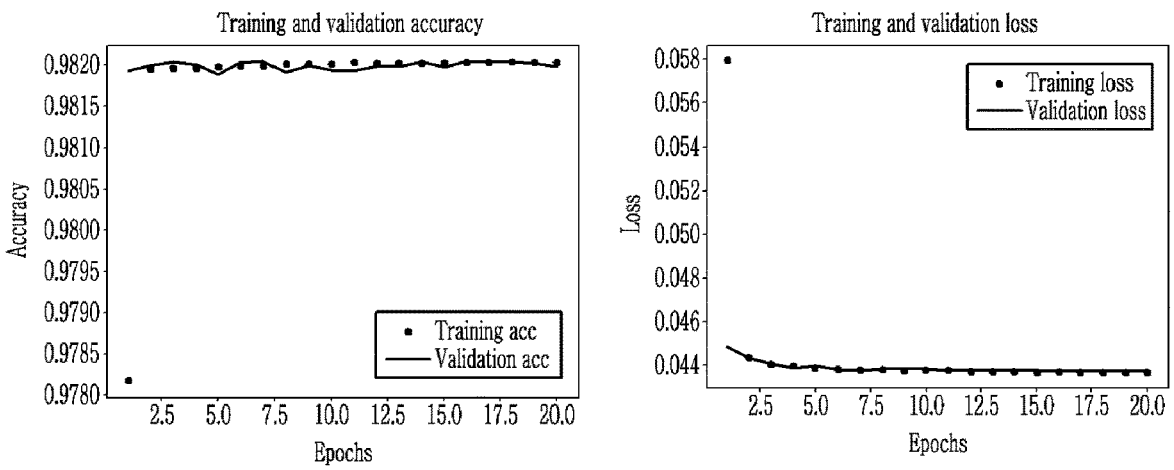

FIG. 23

```
113  ########################
114  # PREDICT FROM NEW DATA BY USING TRAINED MODEL
115  ########################
116  results = model.evaluate(x_test, t_test)
117  print("Prediction results: ", results)
```

```
   32/20000 [..............................] - ETA: 1s
 1408/20000 [=>............................] - ETA: 0s
 3008/20000 [===>..........................] - ETA: 0s
 4576/20000 [=====>........................] - ETA: 0s
 6272/20000 [=======>......................] - ETA: 0s
 8064/20000 [==========>...................] - ETA: 0s
 9792/20000 [============>.................] - ETA: 0s
11552/20000 [==============>...............] - ETA: 0s
13344/20000 [==================>...........] - ETA: 0s
15136/20000 [====================>.........] - ETA: 0s
16928/20000 [======================>.......] - ETA: 0s
18688/20000 [============================>.] - ETA: 0s
20000/20000 [==============================] - 1s 30us/step
Prediction results:   [0.043675579619407656, 0.9819476414680481]
```

FIG. 24
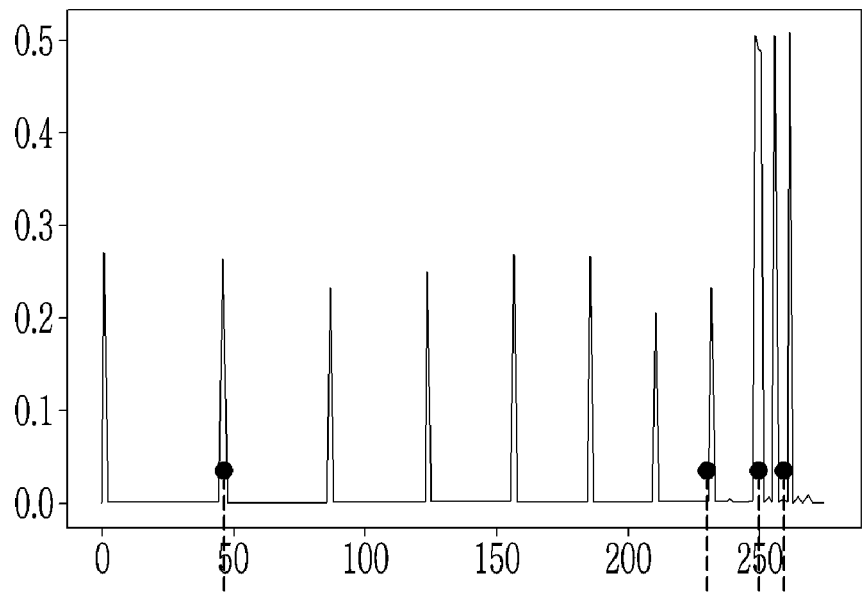
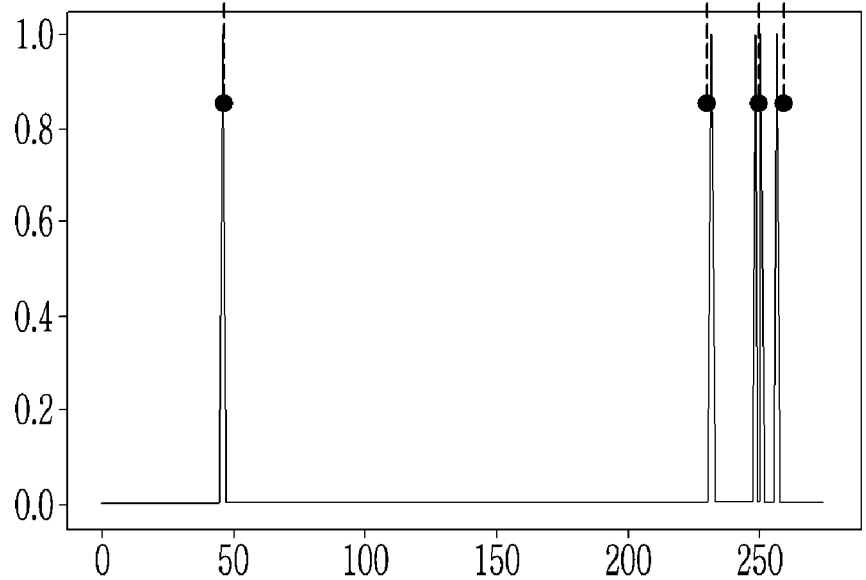

FIG. 25

```
[1] np.where(predict_results[0] > 0.2)
   (array([ 1, 46, 87, 124, 157, 186, 211, 232, 249, 250, 251, 256, 257,
           262], dtype=int64), )
```
PREDICTED VULNERABLE PATH (LINK)

```
[1] np.where(t_test[0] > 0)
   (array([46, 232, 249, 251, 257] dtype=int64), )
```
CORRECT ANSWER VULNERABLE PATH (LINK)

METHOD AND APPARATUS FOR PREDICTING ATTACK VULNERABILITY OF COMPUTER NETWORK

CROSS-REFERENCE TO RELATED APPLICATION

This application claims priority to and the benefit of Korean Patent Application No. 10-2020-0098708 filed in the Korean Intellectual Property Office on Aug. 6, 2020, the entire contents of which are incorporated herein by reference.

BACKGROUND OF THE INVENTION

(a) Field of the Invention

This description relates to a method and apparatus for predicting an attack vulnerability of a computer network using a neural network model.

(b) Description of the Related Art

An attack graph can visually represent the expected attack path for the system, which is determined using the system's asset information and Common Vulnerabilities and Exposures (CVE) database.

Attack vulnerability scanning tools can be used to check the security of a computer network. The attack vulnerability scanning tools can determine the presence or absence of vulnerabilities in individual hosts based on the network and provide a list of discovered vulnerabilities. On the other hand, the attack graph can identify vulnerable hosts or threatening vulnerabilities on the attack path and also visually display elements that are central to the attack path through topology-based analysis.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment provides a method for predicting an attack vulnerability of a target computer network using a neural network model.

Another embodiment provides an apparatus for predicting an attack vulnerability of a target computer network using a neural network model.

According to an embodiment, a method for predicting an attack vulnerability of a target computer network using a neural network model is provided. The method includes: collecting topology and asset information of a computer network which is created in a virtual environment; converting the topology and asset information into a training data set for training the neural network model; training the neural network model based on the training data set; and inferring the attack vulnerability of the target computer network using the trained neural network model.

The collecting topology and asset information of the computer network which is created in a virtual environment may include: constructing a virtual topology of the computer network in the virtual environment; calculating a vulnerability score of each of a plurality of hosts included in the constructed virtual topology; generating a host connection matrix between the plurality of hosts; and generating an attack path table corresponding to the topology based on the host connection matrix and the vulnerability score of each of the plurality of hosts.

The converting the topology and asset information into a training data set for training the neural network model may include generating the training data set by preprocessing the host connection matrix, the asset information, and the attack path table.

The generating the training data set by preprocessing the host connection matrix, the asset information, and the attack path table may include generating host connection information based on a topology table on the topology and the host connection matrix.

The generating the training data set by preprocessing the host connection matrix, the asset information, and the attack path table may include generating asset connection information based on the asset information and the host connection matrix.

The generating the training data set by preprocessing the connection matrix, the asset information, and the attack path table may include generating attack path information corresponding to the topology based on the attack table.

The method may further include generating the training data set based on the host connection information, the asset connection information, and the attack path information.

The inferring the attack vulnerability of the target computer network using the trained neural network model may include: collecting topology and asset information of the target computer network; generating an input data set by pre-processing the topology and asset information of the target computer network; and inferring the attack vulnerability of the target computer network by using the neural network model trained based on the input data set.

According to another embodiment, an apparatus for predicting an attack vulnerability of a target computer network using a neural network model is provided. The apparatus includes: a processor and a memory, wherein the processor executes a program stored in the memory to perform: collecting topology and asset information of a computer network which is created in a virtual environment; converting the topology and asset information into a training data set for training the neural network model; training the neural network model based on the training data set; and inferring the attack vulnerability of the target computer network using the trained neural network model.

When the processor performs the collecting topology and asset information of the computer network which is created in a virtual environment, the processor may perform: constructing a virtual topology of the computer network in the virtual environment; calculating a vulnerability score of each of a plurality of hosts included in the constructed virtual topology; generating a host connection matrix between the plurality of hosts; and generating an attack path table corresponding to the topology based on the host connection matrix and the vulnerability score of each of the plurality of hosts.

When the processor the converting the topology and asset information into a training data set for training the neural network model, the processor may perform: generating the training data set by preprocessing the host connection matrix, the asset information, and the attack path table.

When the processor performs the generating the training data set by preprocessing the host connection matrix, the asset information, and the attack path table, the processor may perform generating host connection information based on a topology table on the topology and the host connection matrix.

When the processor performs the generating the training data set by preprocessing the host connection matrix, the asset information, and the attack path table, the processor may perform generating asset connection information based on the asset information and the host connection matrix.

When the processor performs the generating the training data set by preprocessing the host connection matrix, the asset information, and the attack path table, the processor may perform generating attack path information corresponding to the topology based on the attack table.

The processor may execute the program to further perform generating the training data set based on the host connection information, the asset connection information, and the attack path information.

When the processor performs the inferring the attack vulnerability of the target computer network using the trained neural network model, the processor may perform: collecting topology and asset information of the target computer network; generating an input data set by preprocessing the topology and asset information of the target computer network; and inferring the attack vulnerability of the target computer network by using the neural network model trained based on the input data set.

The apparatus may further include a user interface to visualize the inferred attack vulnerability.

BRIEF DESCRIPTION OF THE DRAWINGS

FIG. 4 is an illustration of a network asset dictionary of a computer network according to an embodiment.

FIG. 7 is an illustration of a topology table according to an embodiment.

FIG. 8 is an example illustrating a connection matrix reconstructed into a one-dimensional numeric sequence according to an embodiment.

FIG. 9 is an illustration of a service table according to an embodiment.

FIG. 10 is an illustration of an attack path table according to an embodiment.

FIG. 12 is an illustration of encoded asset information according to an embodiment.

FIG. 18 is a schematic diagram illustrating pseudo codes of data loading for training of a neural network model according to an embodiment.

FIG. 19 is a schematic diagram illustrating a partial configuration of a neural network model according to an embodiment.

FIG. 20 is a schematic diagram illustrating a partial configuration for setting a learning and validation environment of a neural network model according to an embodiment.

FIG. 21 is a schematic diagram illustrating another partial configuration for setting a learning and validation environment of a neural network model according to an embodiment.

FIG. 22 is data and graph showing a learning result of a neural network model according to an embodiment.

FIG. 23 is an illustration of a new data prediction result of a trained neural network model according to an embodiment.

FIG. 24 is a graph showing a validation result of a trained neural network model according to an embodiment.

FIG. 25 is an example showing a validation result of a trained neural network model according to an embodiment.

DETAILED DESCRIPTION OF THE EMBODIMENTS

Figure 1:
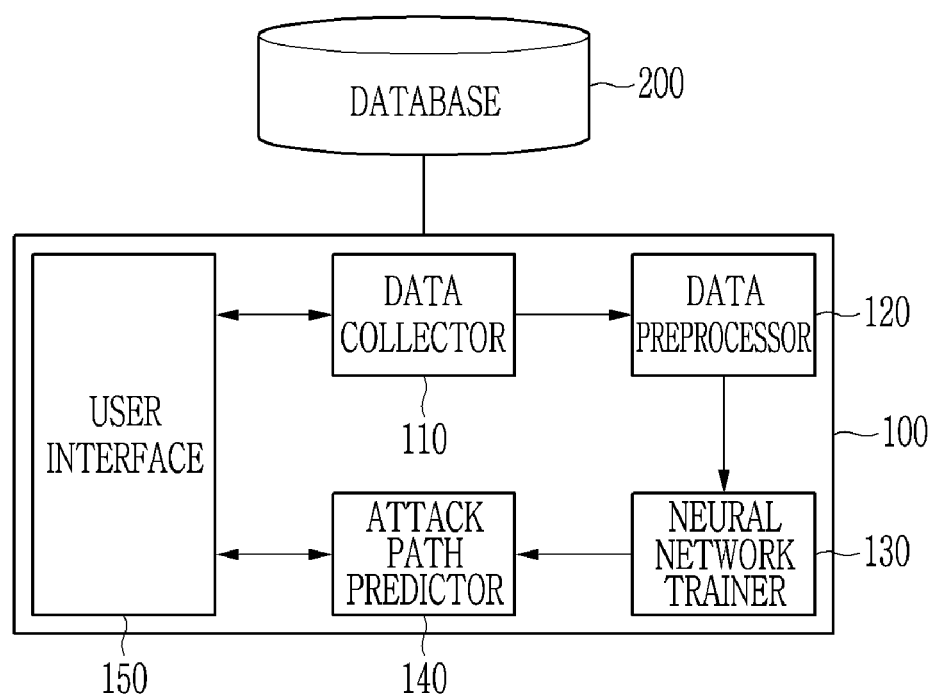
FIG. 1 is a block diagram illustrating an apparatus for predicting an attack vulnerability of a computer network according to an embodiment.

In the following detailed description, only certain embodiments of the present disclosure have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, a node may be called user equipment (UE), a terminal, a mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a block diagram illustrating an apparatus for predicting an attack vulnerability of a computer network according to an embodiment.

Referring to FIG. 1, an apparatus 100 for predicting an attack vulnerability (that is, weakness for an attack) of a computer network according to an embodiment may include a data collector 110, a data preprocessor 120, a neural network trainer 130, an attack path predictor 140, and a user interface 150, and may be connected to a database (DB) 200.

The data collector 110 may collect data such as topology and asset information required to predict the attack vulnerability of a cyber-attack or a vulnerability to the cyber-attack that may be applied to the computer network. The data collector 110 may store the collected topology and asset information in an intelligent attack graph (IAG) DB.

The data preprocessor 120 may generate learning data for the neural network model by preprocessing the data so that the data stored in the IAG DB can be learned or trained by the neural network model. The preprocessing of the data may include a configuration for converting a text of the data into a number, a configuration for converting a numeric sequence (or string) into a matrix that may express the network connectivity, and the like.

The neural network trainer 130 may train the neural network model to predict the attack vulnerability of the computer network based on the preprocessed learning data.

The attack path predictor 140 may predict the attack vulnerability of a target computer network using the trained neural network model. The attack path predictor 140 according to the embodiment may input topology and asset information of the target computer network into the pre-trained neural network model, and obtain an predicted attack path as an output for the input.

The user interface 150 may visualize the predicted attack path for the attack vulnerability.

The database 200 may include an IAG DB and a predictive attack graph (PAG) DB. IAG DB may store randomly generated topology and asset information of each topology, where the topology and the asset information of each of the topology may be stored in the IAG DB after mapping with prediction-based attack path. The PAG DB may store edges between hosts (e.g., flow of packets, etc.), a vulnerability score of each host, and the attack path generated based on the prediction.

Figure 2:
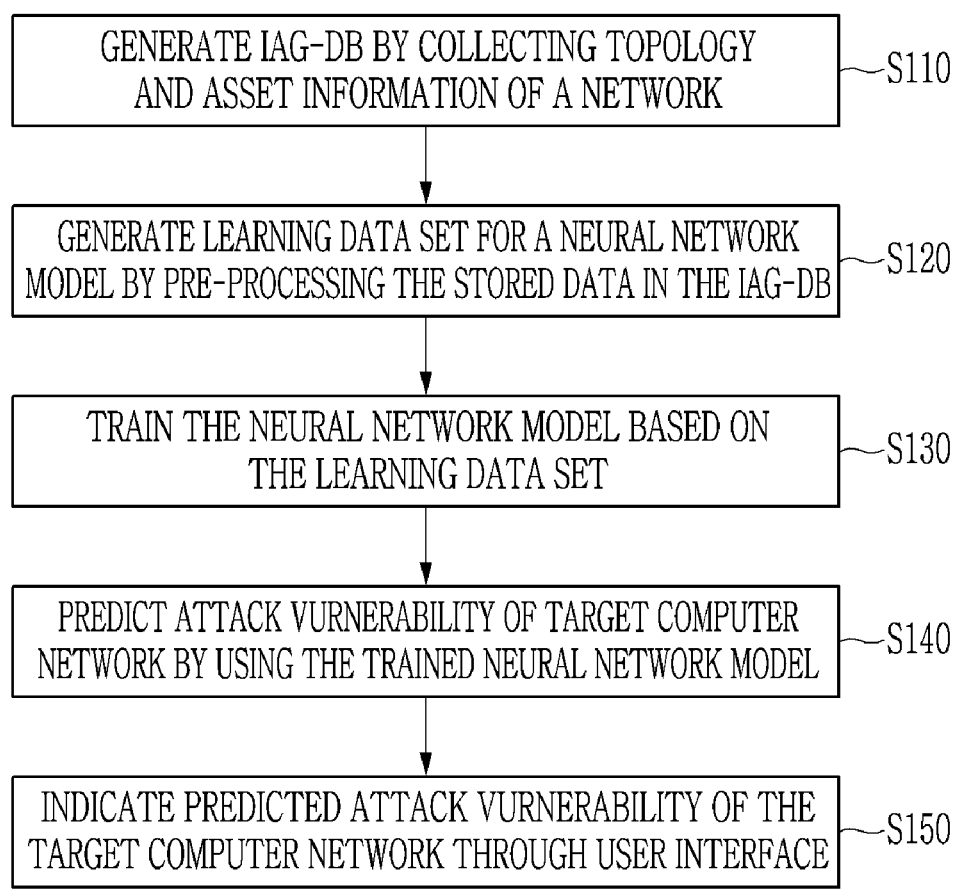
FIG. 2 is a flowchart illustrating a method for predicting an attack vulnerability of a computer network according to an embodiment.
Figure 3:
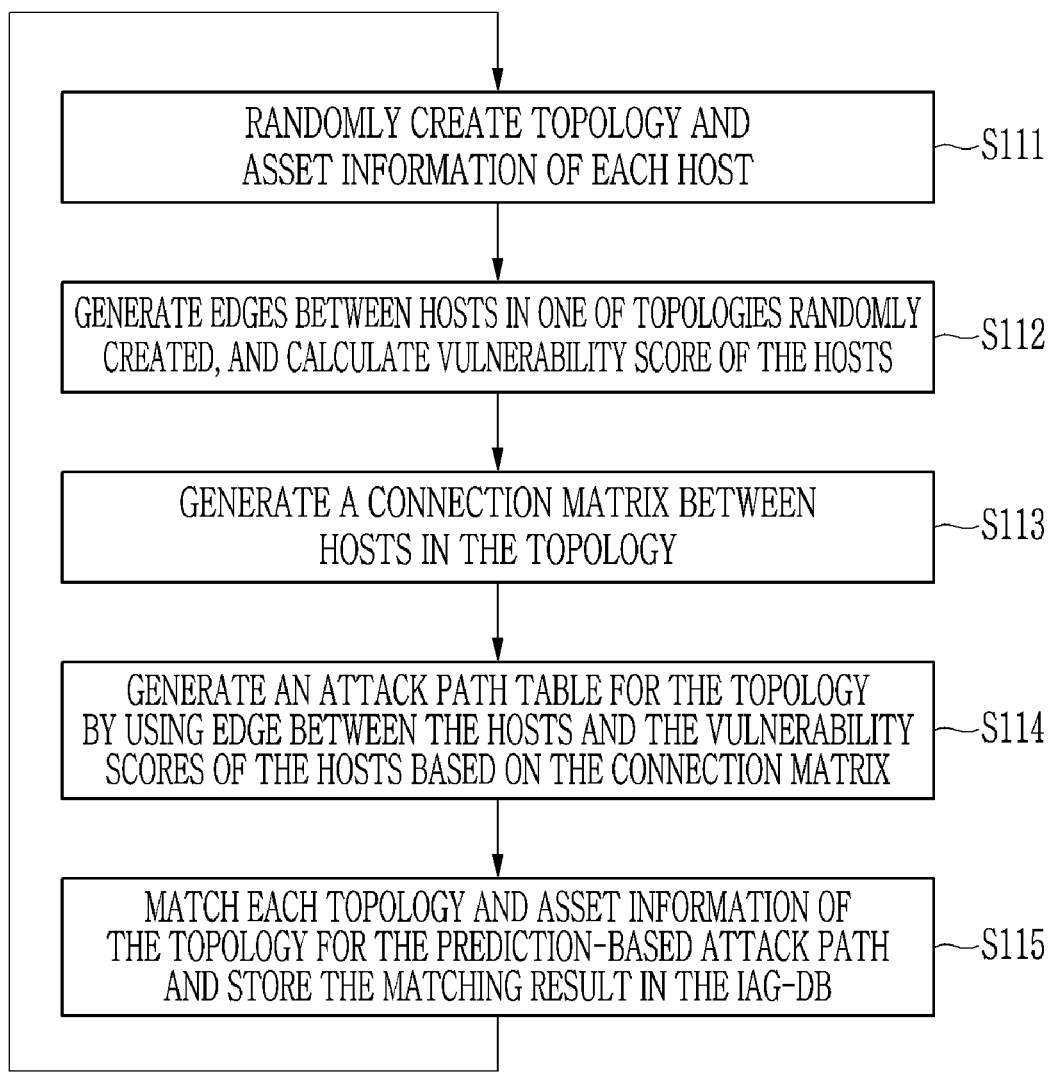
FIG. 3 is a flowchart illustrating a method for collecting learning data according to an embodiment.

FIG. 2 is a flowchart illustrating a method for predicting an attack vulnerability of a computer network according to an embodiment, and FIG. 3 is a flowchart illustrating a method for collecting learning data according to an embodiment.

Referring to FIG. 2, the data collector 110 may generate the IAG DB by collecting topology and asset information of a virtual computer network (S110). The data collector 110 may construct a topology of the virtual computer network in a virtual environment in order to predict the attack vulnerability of the cyber-attack to the computer network (e.g., in a real world), and randomly create asset information of each host (or network device) of the virtual topology. The asset information of the host may include an operating system (OS) of the host and services being provisioned in the host. That is, the data collector 110 may construct a virtual network topology, randomly determine which OS is used and which service is running by the host included in each topology, and generate a prediction-based attack path accordingly. The prediction-based attack path may be a correct answer data for the topology and the asset information of the hosts included in the topology, and the topology and asset information and the prediction-based attack path corresponding the topology and asset information may be matched with each other and stored in the IAG DB. The data collector 110 may repeatedly execute, in a predetermined number of times (e.g., tens of thousands of times), the process described above: 'a step of creating topology and asset information→a step of generating predicted attack path corresponding to created topology and asset information→a step of matching/storing the topology and asset information and the predicted attack path', so that initial data for training the neural network model can be generated. Hereinafter, a method of collecting learning data by the data collector 110 according to an exemplary embodiment will be described in detail with reference to FIG. 3.

Referring to FIG. 3, the data collector 110 may randomly create topology and asset information of each host included in the topology (S111). The data collector 110 may perform procedures, which includes a step of generating a network asset dictionary, a step of generating simulation graph, a step of setting up a router and updating a dictionary, a step of updating a subnet, a step of updating a link, and a step of updating a host, to create the topology and asset information. FIG. 4 is an illustration of a network asset dictionary of a computer network according to an embodiment.

The data collector 110 may perform the generation step of the network asset dictionary by defining a schema of the network asset dictionary for creating system state information and topology information. The network asset dictionary may include at least one of fields including a timestamp field for distinguishing a point of time at which the dictionary is generated, a system state field indicating the system state information of the network host, and a topology field indicating phase information of the network system. The topology field may include a subnets field, a link field, and a router field indicating a configuration of the network system and a connection between components included in the network system.

A value of the timestamp field may be set to system time at which the point of time of the generation of the network asset dictionary. The system state field (system_state) may indicate a system state of all hosts belonging to the network. The system state of each host may be expressed by a system name (system_name) field, a process field, an operating system (operating_system) field, a system ID (system_id) field, a service field, and a network field. The topology field may include the subnet field, the link field, and the router field for indicating the topology information of the network system. The subnets field may include information about nodes (that is, hosts) having the same default gateway in the network system and the information may include a default gateway (defaultgw), node, netmask, ID (id), and network id (netid). The link field may indicate physical connectivity between components (e.g., hosts) of the network system, and may include information of a destination node (dstnode), a source node (srcnode), a destination interface (dstif), an ID (id), a source interface (srcif). The router field is a field to indicate routers in the network system, and may include information of a default gateway (defaultgw), an interface (interfaces), a type, and a name of the router.

The data collector 110 may perform the generation step of the simulation graph by creating a simulation topology using a graph tool/library (e.g., software application program, library) such as networkX. For example, the data collector 110 may generate graph objects (Graph, G) for creating a networkX-based topology in the step of the generating of the simulation graph.

The data collector 110 may randomly select, at the step of the setting of the router, the number of subnets within the predefined maximum and minimum subnet number ranges and allocate router nodes to graph objects. Then, the data collector 110 may set a default gateway (defaultgw) of the router, determine the number of subnets for the router, set an interface for the router, determine the number of hosts per subnet, and determine switches and hosts per subnet. In addition, the data collector 110 may determine router information (e.g., type, name of the router). And then, the data collector 110 may connect each router on the graph.

The data collector 110 may update, at the step of the updating of the router, router information (e.g., defaultgw, interfaces, type, name) in the network asset dictionary.

The data collector 110 may update, at the step of the updating of the subnet, subnet information (e.g., defaultgw, node, netmask, id, netid) in the network asset dictionary.

The data collector 110 may update, at the step of the updating of the link, link information of the link between the router and the host and the link between the routers in the network asset dictionary. The link information may include information of a destination node (dstnode), a source node (srcnode), a destination interface (dstif), an ID (id), and a source interface (srcif).

The data collector 110 may read a CVE file (CVE_PORT_WEIGHT_rev.csv) containing vulnerability information of the OS and the service and arbitrarily allocate the OS and the service to each host included in the topology at the step of the updating of the host. For example, one OS may be selected, and n services may be randomly selected within a predetermined maximum and minimum value range. The selected OS and service may be used to update the network asset dictionary. A service ID (service_id), a protocol (protocol), port information, and so on may be updated as service information, and a product name (product), a version (version), a manufacturer (vendor), cpe2.3 information, and so on may be updated as process information. In addition, a system name (system_name), a process (processes), an operating system (operating_system), a system ID (system_id), a service (services), a subnet mask (subnet_mask), a default router (default_router), an IP address (ip_address), MAC address (mac address) information and the like may be updated.

As described above, the data collector 110 may generate node information and link information required for generating the graph, and may generate the network topology expressed by nodes and links using the node information and link information.

Thereafter, the data collector 110 may generate edges between hosts in the topology for generating the attack graph, and calculate the vulnerability score of each host (S112). The data collector 110 may store the generated edge and the calculated vulnerability score in the PAG DB. The vulnerability score of each host may be calculated based on the OS and/or service operated in each host.

Then, the data collector 110 may generate a connectivity matrix (CM) between hosts indicating a connection state between hosts in the topology (S113). The data collector 110 according to an embodiment may use an adjacency matrix in graph theory, which represents connections between nodes. The host connection matrix may express the connection state for each host as 0 and 1. Hosts included in the host list may be sequentially a row index and a column index in the host connection matrix, and a connection between hosts may be indicated as 1, and a non-connection between hosts may be indicated as 0.

Figure 5:
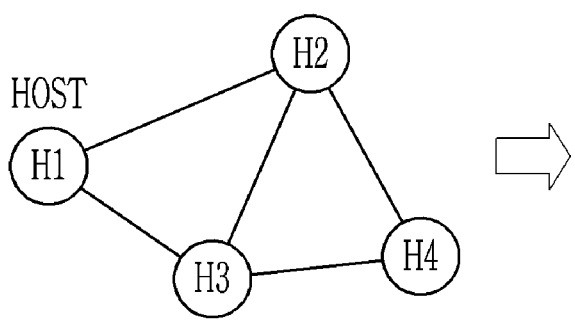
FIG. 5 is an illustration of a host connection matrix in a topology according to an embodiment.

FIG. 5 is an illustration of a host connection matrix in a topology according to an embodiment.

Referring to FIG. 5, host H1 is connected to host H2 and host H3, but is not connected to host H4. The network topology of FIG. 5 may be represented by a connection matrix on the right of FIG. 5.

Thereafter, the data collector 110 may generate an attack path table for the topology by using the edge between the hosts and the vulnerability scores of the host stored in the PAG DB based on the host connection matrix (S114). The data collector 110 according to an embodiment may generate the attack path table for the topology from the edge between hosts and the vulnerability score of the host using a predictive method. In the prediction-based attack graph, the edges between hosts may be reflected as an attack path when a probability that a connection between two hosts will occur is greater than or equal to a predetermined value (or degree). The attack path table corresponding to the topology generated by the data collector 110 may include a correct attack path corresponding to one randomly created topology, and the attack path table may be stored in the PAG DB.

Finally, the data collector 110 may match the randomly created topology and the asset information of the host included in the randomly created topology for the attack path generated based on the prediction and store the matching result in the IAG DB (S115). The data collector 110 may establish the IAG DB as a database for machine learning of the neural network model for predicting weakness of the computer network. Thereafter, the data preprocessor 120 may preprocess the training (learning) data stored in the IAG DB to generate data for the machine learning of the neural network model.

Figure 6:
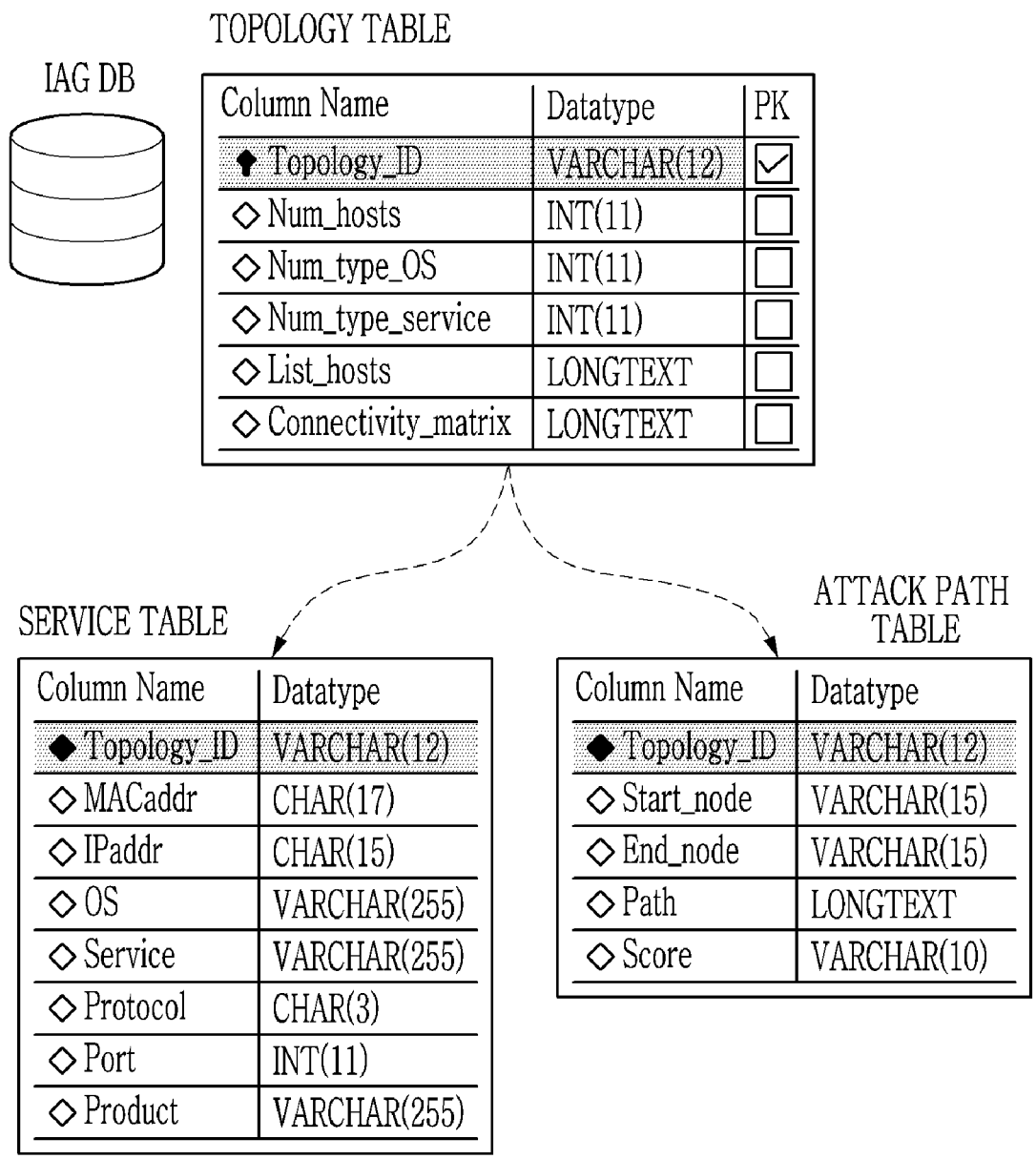
FIG. 6 is a schematic diagram illustrating a data structure of an IAG DB according to an embodiment.

FIG. 6 is a schematic diagram illustrating a data structure of an IAG DB according to an embodiment, FIG. 7 is an illustration of a topology table according to an embodiment, FIG. 8 is an example illustrating a connection matrix reconstructed into a one-dimensional numeric sequence according to an embodiment, FIG. 9 is an illustration of a service table according to an embodiment, and FIG. 10 is an illustration of an attack path table according to an embodiment.

Referring to FIG. 6, the IAG DB may include a topology table, a service table, and an attack path table.

Referring to FIG. 7, a topology_ID column in the topology table may be an identifier for distinguishing randomly created topologies. The number of hosts (Num_hosts) column may be the total number of the hosts included in each topology, the number of OS types (Num_type_OS) column may be the total number of OS types installed on the hosts in the topology, and the number of service types (Num_type_service) column may be the total number of service types installed on the hosts included in the topology. The host list (List_hosts) column may list IP addresses of the hosts included in the topology. A connection matrix (connectivity_matrix) column may indicate connectivity between each host in the topology.

In the connection matrix column, each row of the connection matrix between hosts (that is, the host connection matrix) may be decomposed and reconstructed into a one-dimensional numeric sequence. Referring to FIG. 8, for example, when four hosts are included in a topology t_0 and the IP addresses of each host are '192.168.20.6', '192.168.30.2', '192.168.30.3', and '192.168.40.2', if the connection relationship between hosts is the same as in FIG. 5, the connection matrix column is [1,1,1,0,1,1,1,1,1,1,1,1, 0,1,1,1].

Referring to FIG. 9, a topology_ID column in the service table may be an identifier for distinguishing the topologies. If the topology ID in the topology table and the topology ID in the service table are the same, it may refer to the same topology. An MACaddr column may be a MAC (Medium Access Control) address of the host. An IPaddr column may be an IP (Internet Protocol) address of the host. An OS column may indicate the OS installed on the host. A service column may indicate the service installed on the host. A protocol column and a port column may indicate a protocol and a port number in which the service is executed. A product column may be the name of the product in which the corresponding service is installed.

Referring to FIG. 10, a Topology_ID column in the attack path table may be an identifier for distinguishing topologies. If the topology ID of the topology table and the topology ID of the service table are the same, it may indicate the same topology. A Start_node column may indicate a start node of the attack path on the 'Path'. An end node (End_node) may represent a node located at the end of the attack path. A Path column may indicate the attack path, and the start and the end of the attack path are IP addresses of the start node (Start_node) and the end node (End_node). An intermediate node in the attack path may be expressed or may be omitted when there is no intermediate node in the attack path. A Score column may be the vulnerability score indicating a degree of vulnerability of the topology to corresponding attack path.

Referring to FIG. 2, the data preprocessor 120 may pre-process the learning data stored in the IAG DB to generate learning data for the neural network model (S120). The data preprocessor 120 may extract, from the learning data stored in the IAG DB, characteristics for training the neural network model used for inferring the vulnerability of the computer network against the cyber-attack. Hereinafter, a method for pre-processing the training data will be described in detail with reference to FIGS. 11 to 16.

Figure 11:
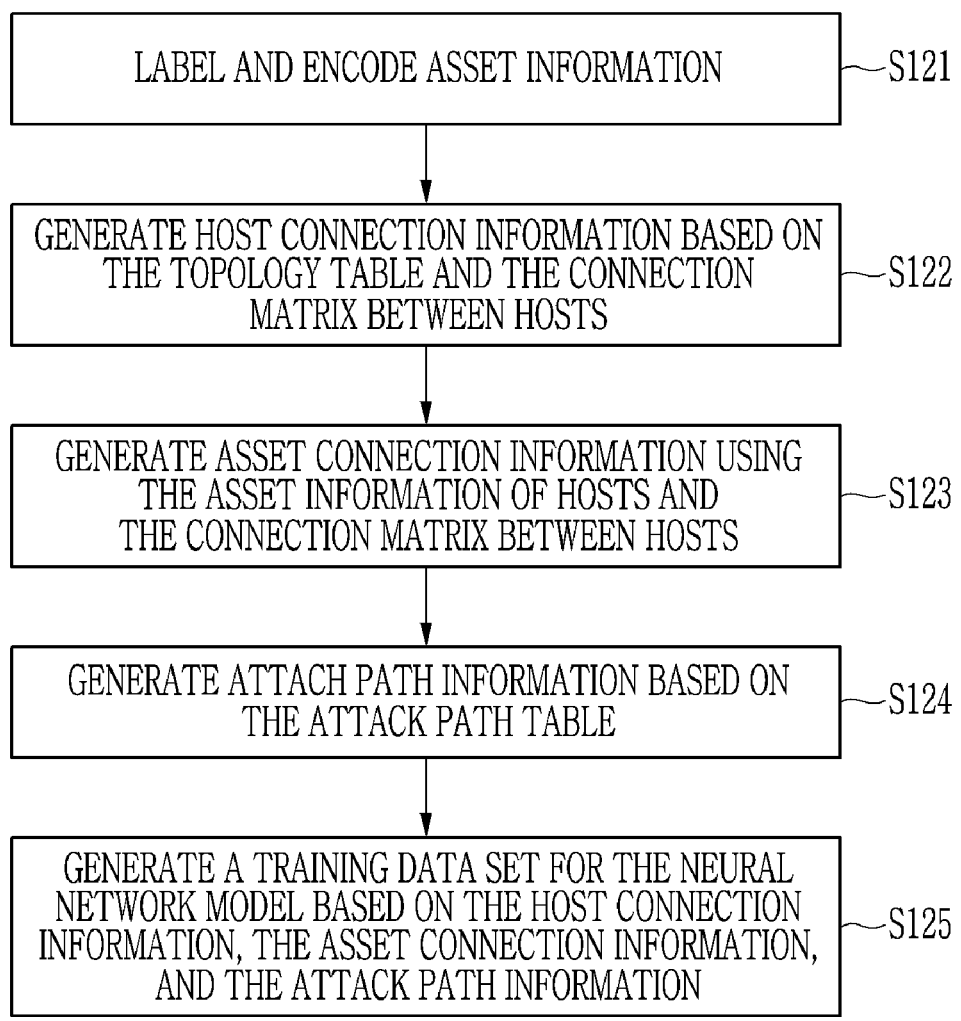
FIG. 11 is a flowchart illustrating a method for preprocessing learning data according to an embodiment.

FIG. 11 is a flowchart illustrating a method for pre-processing learning data according to an embodiment and FIG. 12 is an illustration of encoded asset information according to an embodiment.

Referring to FIG. 11, the data preprocessor 120 may label and encode the asset information of the host (S121). The data preprocessor 120 according to an embodiment may read a topology of the network, host asset information, a host connection matrix, an attack path table, and the like from the IAG DB. The data preprocessor 120 may convert the read string-type asset information (information about an OS installed in the host, information about a service executed in the host, etc.) into numbers. For example, the data preprocessor 120 may assign identification numbers to all types of OSs that can be installed in the host and may assign an identification number incremented by 1 from the previously assigned identification number to a new OS. According to an embodiment, a process in which the data preprocessor 120 assigns an identification number to the OS is referred to an asset information labeling, and an OS dictionary may be generated by the asset information labeling. In addition, the data preprocessor 120 may perform 'asset information encoding' of converting the OS installed in each host into the identification number with reference to the OS dictionary.

The data preprocessor 120 may also generate a service dictionary by performing 'asset information labeling' for the service executed on the host and perform asset information encoding that converts the service of the host into the identification number based on the service dictionary.

The data preprocessor 120 according to the embodiment may perform asset information labeling and asset information encoding as follows.

The data preprocessor 120 according to an embodiment may read CVE_OS_WEIGHT.csv and CVE_PORT_WEIGHT_rev.csv files, and generate an OS list and service list from the CVE_OS_WEIGHT.csv and CVE_PORT_WEIGHT_rev.csv files. OS list may include all OS types (e.g., Windows10, Ubuntu_14, Mac_OS_X_10.10, etc.) installed on each host, included in network asset information. The service list may include all service types (e.g., tcpmux, ssh, etc.) executed on each host, which are included in the network asset information. The data preprocessor 120 may generate the OS dictionary and the service dictionary constructed as {key: value} by assigning a unique identification number to each OS type and service type included in the OS list and service list. The OS dictionary and the service dictionary may be referred to as an OS token (OS_token) and a service token (Service_token), respectively. For example, the OS token may be {key: value}={Windows10: 29, Ubuntu_14: 60, Max_OS_X_10.10: 42}, and the service token may be {tcpmux: 8, SSH: 39, telnet: 33}. To this end, the data preprocessor 120 may read the values of the OS column and the service column from the service table of the IAG DB. In addition, the data preprocessor 120 may combine the topology ID and IP address read from the topology ID column and IP address column in the service table and use the combined ID and IP address as a unique identifier. Referring to FIG. 12, Windows 10 is installed on a host which is included in the t_0001 topology and has an IP address of 192.168.10.2, and the tcpmux service may be executed on the host. In addition, the data preprocessor 120 may generate host connection information based on the topology table stored in the IAG DB and the connection matrix between hosts included in the topology (S122). The connection matrix between hosts may be the same as that previously generated by the data collector 110. The data preprocessor 120 may read a list of the hosts included in the topology and the connection matrix between each host from the host list (List_hosts) column and the connection matrix (Connectivity_matrix) column of the topology table in the IAG-DB. In addition, the data preprocessor 120 may sequentially reconstruct one-dimensional numeric sequence related to the two-dimensional connection matrix in the connection matrix column in order of the host of the host list. For example, the data preprocessor 120 may gene a two-dimensional connection matrix indicating host connection information by using the topology ID, the IP address of each host, and the connection matrix.

Figure 13:
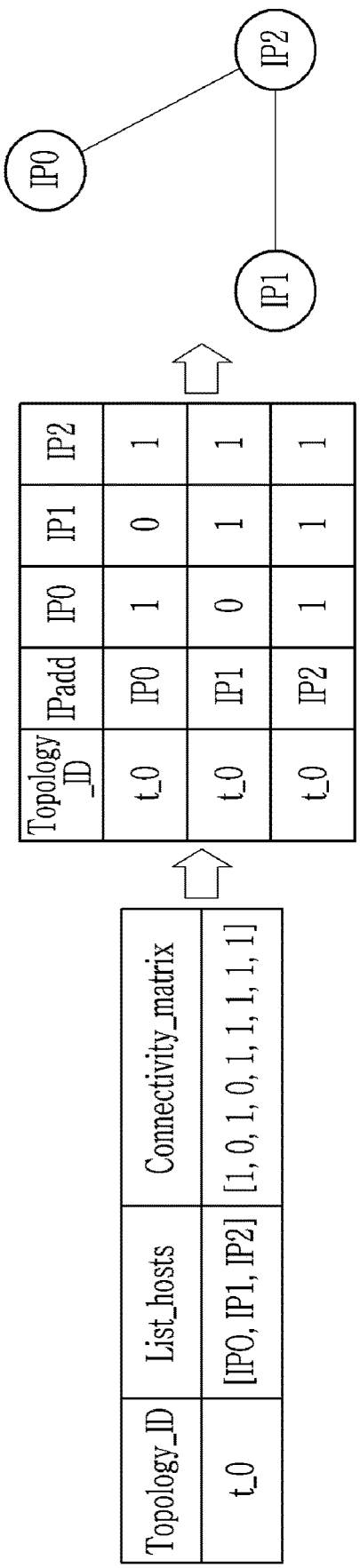
FIG. 13 is a schematic diagram illustrating a method for generating host connection information according to an embodiment.

FIG. 13 is a schematic diagram illustrating a method for generating host connection information according to an embodiment.

Referring to FIG. 13, a two-dimensional connection matrix including three hosts IP0, IP1, and IP2 included in topology t_0 and a connection relationship between each host is shown.

The number of hosts (Num_hosts) column of the topology table may indicate the number of hosts included in one topology. When the number of hosts is n, for the same topology ID (e.g., Topology_ID=t_0), the length of the one-dimensional vector (i.e., numeric sequence) of the host connection matrix column is n×n. The two-dimensional connection matrix may be generated by sequentially dividing the one-dimensional vector of the connection matrix column by n and reconstructing the divided vector into an n×n matrix. For the two-dimensional connection matrix generated from the host connection matrix column, the host IP address of the host list column may be used as an index of the row and column of the two-dimensional connection matrix.

Figure 14:
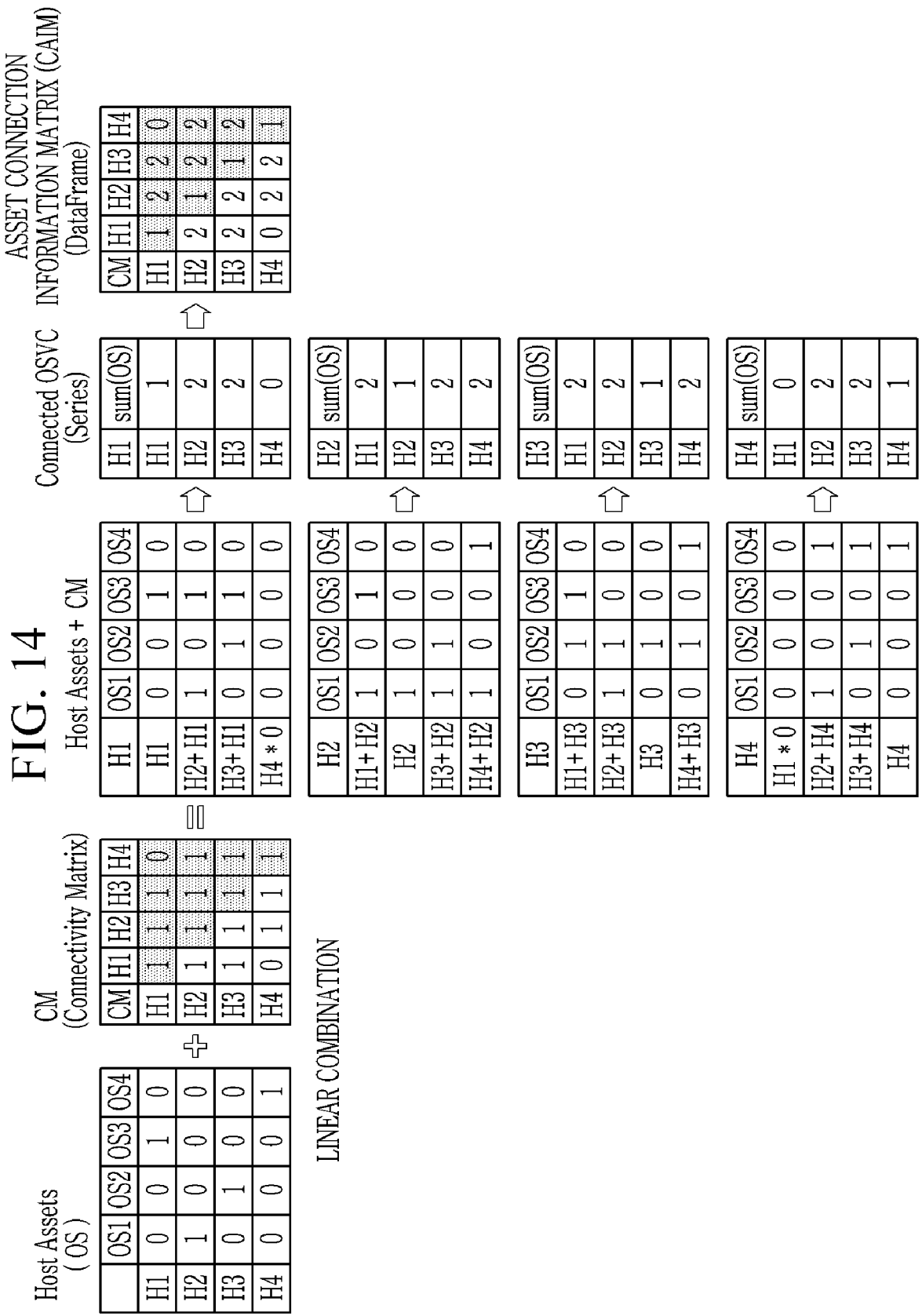
FIG. 14 is a schematic diagram illustrating a method for generating asset connection information according to an embodiment.

The data preprocessor 120 according to the embodiment may generate asset connection information based on the asset information of each host and the connection matrix between the hosts (S123). FIG. 14 is a schematic diagram illustrating a method for generating asset connection information according to an embodiment. Referring to FIG. 14, a Connected Assets Information Matrix (CAIM) may be generated through a linear combination between OS information installed in each host represented in the two-dimensional matrix and the connection matrix between 4 hosts. The asset connection information matrix may express the connectivity between hosts and, simultaneously, may include asset information of a connected (adjacent) host that can affect the asset information installed in the host. In the process of generating the asset connection information matrix, a sum of the asset information of each host may be used as a weight value for the degree of vulnerability and may be learned that the greater the sum of the asset information, the higher the likelihood of being vulnerable to attack.

Figure 15:
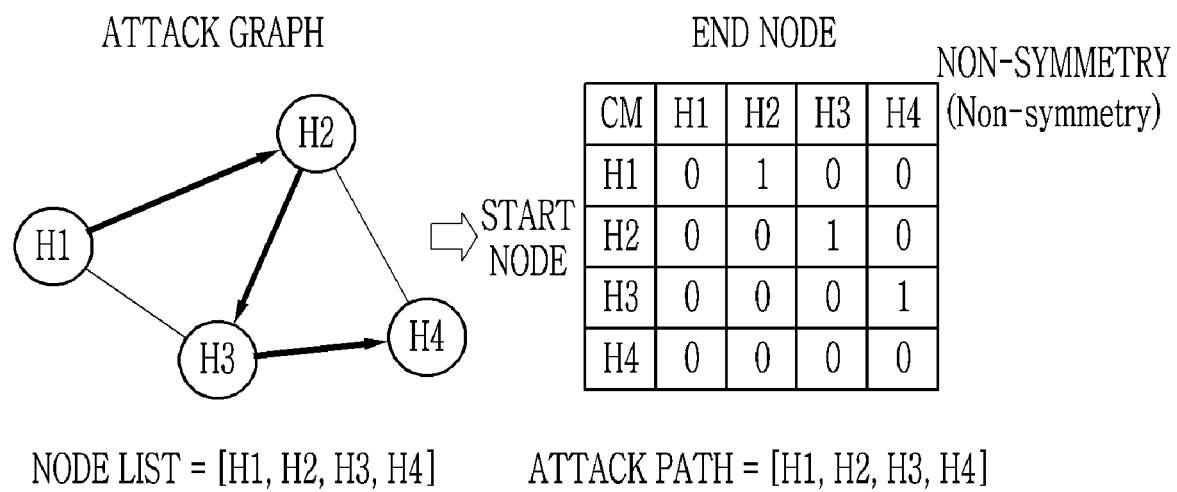
FIG. 15 is a schematic diagram illustrating a method for generating attack path information according to an embodiment.

The data preprocessor 120 according to the embodiment may generate attack path information based on the attack path table (S124). FIG. 15 is a schematic diagram illustrating a method for generating attack path information according to an embodiment. The data preprocessor 120 according to the embodiment may generate an attack path matrix (APM) as the attack path information corresponding to one topology. The attack path matrix may be used a label (that is, ground truth) during the training of the neural network and may represent the correct answer attack path corresponding to each topology.

The data preprocessor 120 may construct the attack path matrix as a two-dimensional matrix and use a host address in the host list column of the topology table as an index of the row and column of the attack path matrix.

The attack path table may include n attack paths for the same topology ID (Topology_ID) in order of the highest degree of vulnerability in the topology, that is, the highest vulnerability score. The n attack paths may be stored in a path (Path) column of the attack path table. The attack path may be composed of a start node, an intermediate node, and an end node. The start node and the end node may be specified in the attack path, and the intermediate node may be omitted. Each of the start node and the end node may be included in the start node (Start_node) column and the end node (End_node) column of the attack path table.

Referring to FIG. 15, the start node may be allocated as a row index of the attack path matrix, and the end node may be allocated as a column index. In the attack path of the attack path table, two host addresses may be selected sequentially, the first address may be assigned as the start node, and the second address may be assigned as the end node. '1' in the attack path matrix may indicate that the edge from the start node to the end node is included in the attack path. Alternatively, a value in the score (Score) column of the attack path table may be assigned as an element of the attack path matrix.

Figure 16:
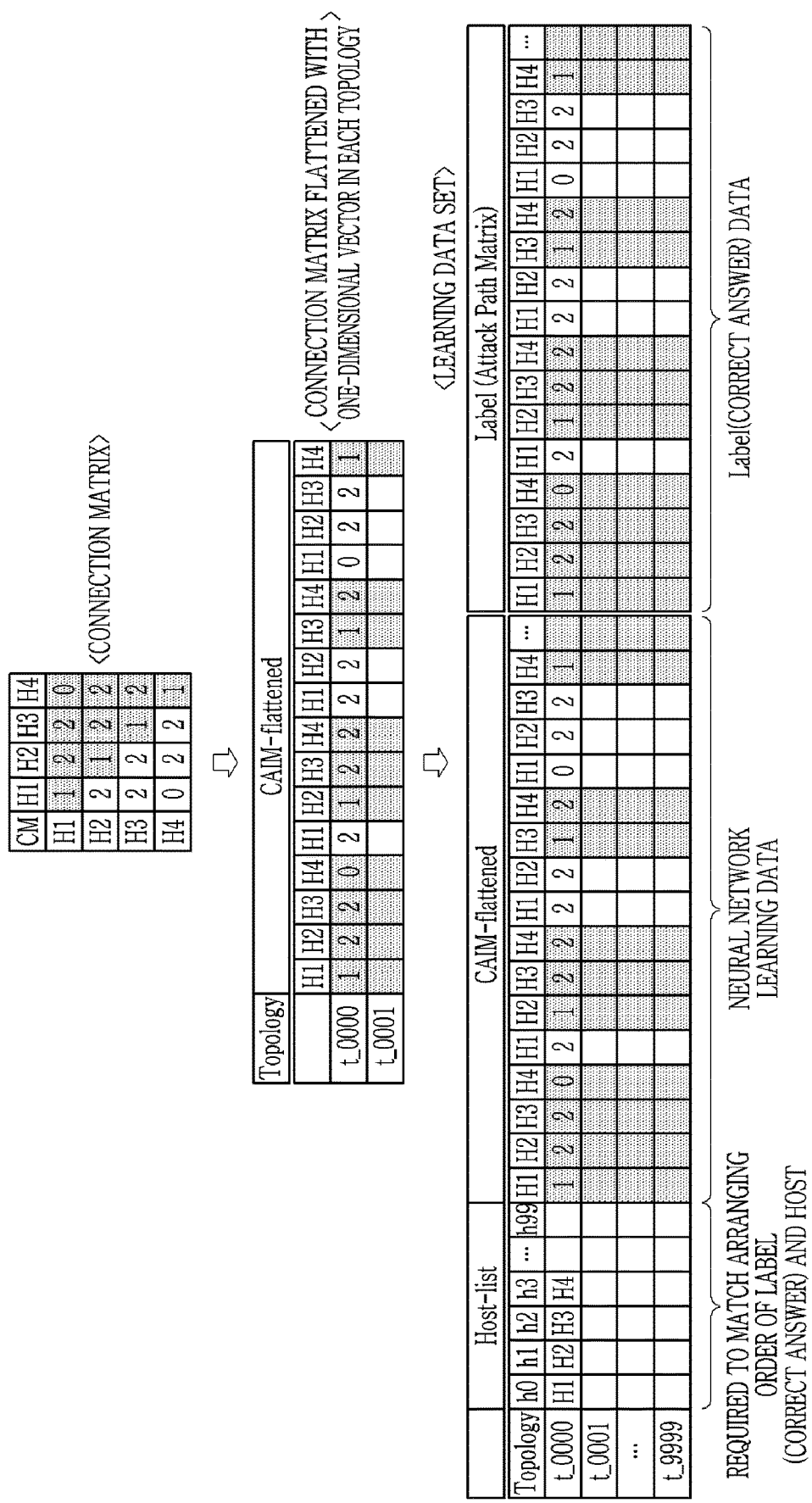
FIG. 16 is a schematic diagram illustrating a method for generating a training data set of a neural network model according to an embodiment.

Finally, the data preprocessor 120 may generate a training data set for training the neural network model based on the host connection information, the asset connection information, and the attack path information (S125). FIG. 16 is a schematic diagram illustrating a method for generating a training data set of a neural network model according to an embodiment.

For example, referring to FIG. 16, the data structure of the training data set may include lists of hosts included in each topology and the asset connection information matrix flattened into a one-dimensional vector, and the correct answer attack path may be matched in a flattened form with the one-dimensional vector in each topology. The training data set may include the host list, the asset connection information, and the attack path information for virtually randomly generated topologies in the form of a two-dimensional data structure.

Figure 17:
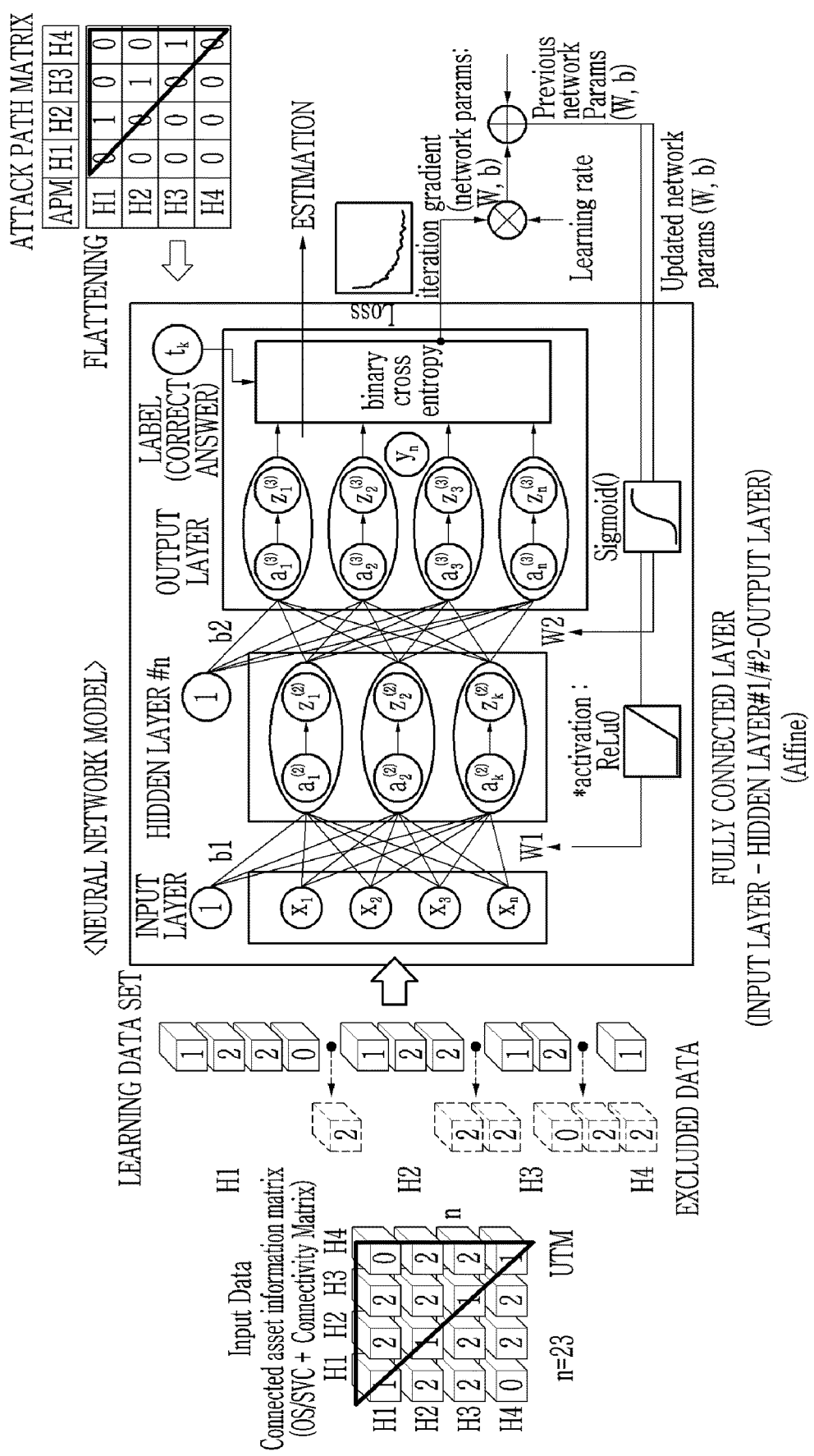
FIG. 17 is a schematic diagram illustrating a neural network model according to an embodiment.

Referring back to FIG. 2, the neural network trainer 130 according to an embodiment may train the neural network model for predicting the vulnerability of the computer network based on the training data set generated by the data preprocessing unit 120 (S130). FIG. 17 is a schematic diagram illustrating a neural network model according to an embodiment, and FIG. 18 is a schematic diagram illustrating pseudo codes of data loading for training of a neural network model according to an embodiment.

The neural network model may use the asset connection information (CAIM) and the attack path information (APM) as the learning and answer data. The neural network model may be trained in way that solves a multiclass/multilabel problem of estimating a plurality of possible labels (e.g., APM) that are not mutually exclusive from one sample (e.g., CAIM). The neural network model may utilize a symmetric matrix feature of the CAIM to reduce a dimension of input data. For example, the neural network model may be trained using only the upper triangular matrix (UTM) of the CAIM and the APM. In a neural network model, an input layer, a hidden layer, and an output layer may be configured as a fully connected layer. A ReLU function may be used as an activation function of the hidden layer of the neural network model, and a sigmoid function may be used as the activation function of the output layer. An optimizer of the neural network model may be composed of dynamic learning rate algorithms such as RMSProp and Adam. A binary cross entropy function may be applied as a loss function of the neural network model.

For example, when the training data includes 100,000 topologies, 80,000 topology data may be used for learning (including training and validation), and the remaining 20,000 topology data may be used for evaluation of trained neural network models. A prediction result of the top five weak paths (links) of the trained model may be measured with an certain level of accuracy (e.g., 98.2%). The accuracy may be a ratio of correctly predicted data among the entire data. For example, it may be 'accuracy=(TP+TN)/(total number of data)' (TP: true positive, TN: true negative). The accuracy may indicate the degree to which the attack path classified by the neural network model is consistent with the labeled attack path. The trained neural network model may predict the vulnerable path (link) that matches the vulnerable path of the correct answer by inferring the attack vulnerability of the computer network and may additionally predict the possible vulnerable path.

Referring to FIG. 17, the input layer of the neural network model may include the same number of nodes as the number of elements of the input vector of the CAIM included in one sample. One sample may be a training data set corresponding to one topology. For example, the training data set depicted in FIG. 16 includes 10,000 samples, and each sample may correspond to each topology.

The hidden layer of the neural network model may include two fully connected layers. The activation function of the hidden layer may be configured as the ReLU function. The output layer may include the same number of nodes as the number of elements of the input vector of the APM. The activation function of the output layer may be configured as the sigmoid function. The loss function of the neural network model may be configured as the binary cross entropy function. The optimizer of the neural network model may be configured as the dynamic learning rate algorithm such as RMSprop and Adam. FIG. 19 is a schematic diagram illustrating a partial configuration of a neural network model according to an embodiment. Referring to FIG. 19, pseudo codes for selecting the ReLU function, the sigmoid function, and the binary cross entropy function are described.

The neural network model according to an embodiment may perform the training and the validation using 80,000 topology data sets among 100,000 data sets during the training process. For example, out of 80,000 data sets, 70,000 data sets may be used as training data, and the remaining 10,000 data sets may be used as validation data.

FIG. 20 is a schematic diagram illustrating a partial configuration for setting a learning and validation environment of a neural network model according to an embodiment.

Referring to FIG. 20, a size of a mini-batch for learning may be set to 512, and the number of epochs may be set to 20. After the training is completed using the 70,000 data set, loss and accuracy of the neural network model trained using 10,000 validation samples may be measured.

FIG. 21 is a schematic diagram illustrating another partial configuration for setting a learning and validation environment of a neural network model according to an embodiment, FIG. 22 is data and graph showing a learning result of a neural network model according to an embodiment, and FIG. 23 is an illustration of a new data prediction result of a trained neural network model according to an embodiment.

With the configuration shown in FIG. 21, the learning and validation result of the trained neural network may be expressed as shown in FIG. 22. Referring to FIG. 22, as a result of the training and validation of the neural network model, when 20 epochs are completed, the loss is 0.04368 and the accuracy has been measured to be 98.2%.

Referring to FIG. 23, when the evaluation is performed on a new data set not used for the training (e.g., 20,000 data sets among 80,000 training data sets) using the trained neural network model, the loss is 0.04367 and the accuracy has been measured to be 98.2%.

FIG. 24 is a graph showing a validation result of a trained neural network model according to an embodiment and FIG. 25 is an example showing a validation result of a trained neural network model according to an embodiment.

Referring to FIGS. 24 and 25, the attack vulnerability predicted by the trained neural network model is [1, 46, 87, 124, 157, 186, 211, 232, 249, 250, 251, 256, 257, 262], and the attack vulnerability of the correct answer [46, 232, 249, 251, 257] have been all predicted correctly. The trained neural network model has further predicted attack vulnerability [1, 87, 124, 157, 186, 211, 250, 256, 262].

Referring back to FIG. 2, the attack path predictor 140 may predict the attack vulnerability of the target computer network from the input data set generated based on the topology and asset information of the target computer network using the trained neural network model (S140). Inference processes for the attack vulnerability using the trained neural network model will be described in detail below with reference to FIG. 26.

Figure 26:
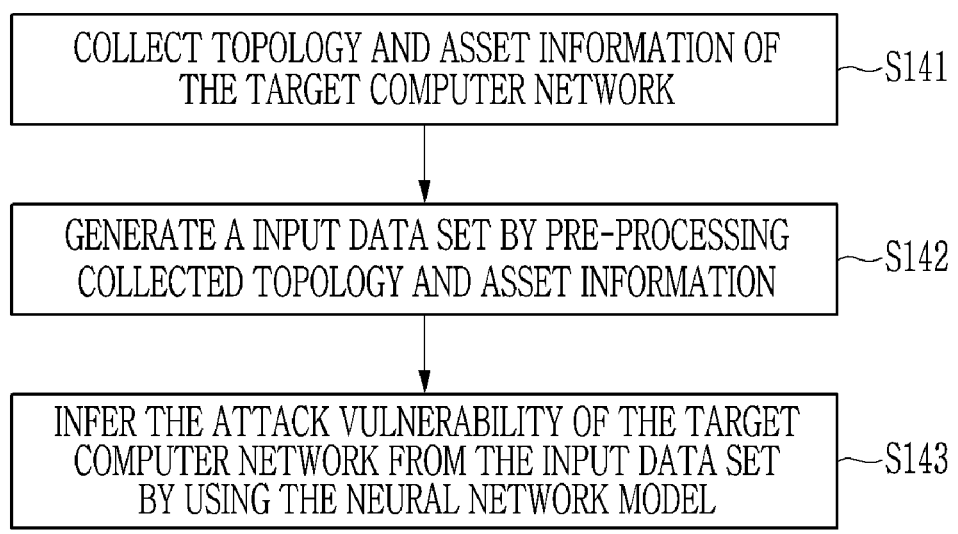
FIG. 26 is a flowchart illustrating a method for predicting an attack vulnerability of a trained neural network model according to an embodiment.

FIG. 26 is a flowchart illustrating an attack path prediction method of a trained neural network model according to an embodiment.

Referring to FIG. 26, the attack path predictor 140 may collect topology and asset information of the target computer network (S141). Then, the attack path predictor 140 may generate an input data set suitable for the inference processes through the neural network model by pre-processing the topology and asset information of the target computer network (S142). The attack path predictor 140 may infer the attack vulnerability of the target computer network from the input data set of the target computer network using the pre-trained neural network model (S143).

Referring back to FIG. 2, the inference result of the attack path predictor 140, that is, the predicted attack vulnerability of the target computer network may be indicated through the user interface 150 (S150).

As described above, since the attack vulnerability prediction apparatus according to the embodiments infers the attack vulnerability from the training data set generated based on the topology and asset information of the target computer network by using the pre-trained neural network model, the attack vulnerabilities can be predicted quickly, resource consumption can be saved, and corresponding responses can be quickly executed. In addition, since the attack vulnerability prediction device according to the embodiments predicts the attack vulnerability only for a predetermined number of attack paths including vulnerabilities, it is possible to quickly predict the attack vulnerability and resources consumed in generating the attack graph for the entire attack path can be saved.

Figure 27:
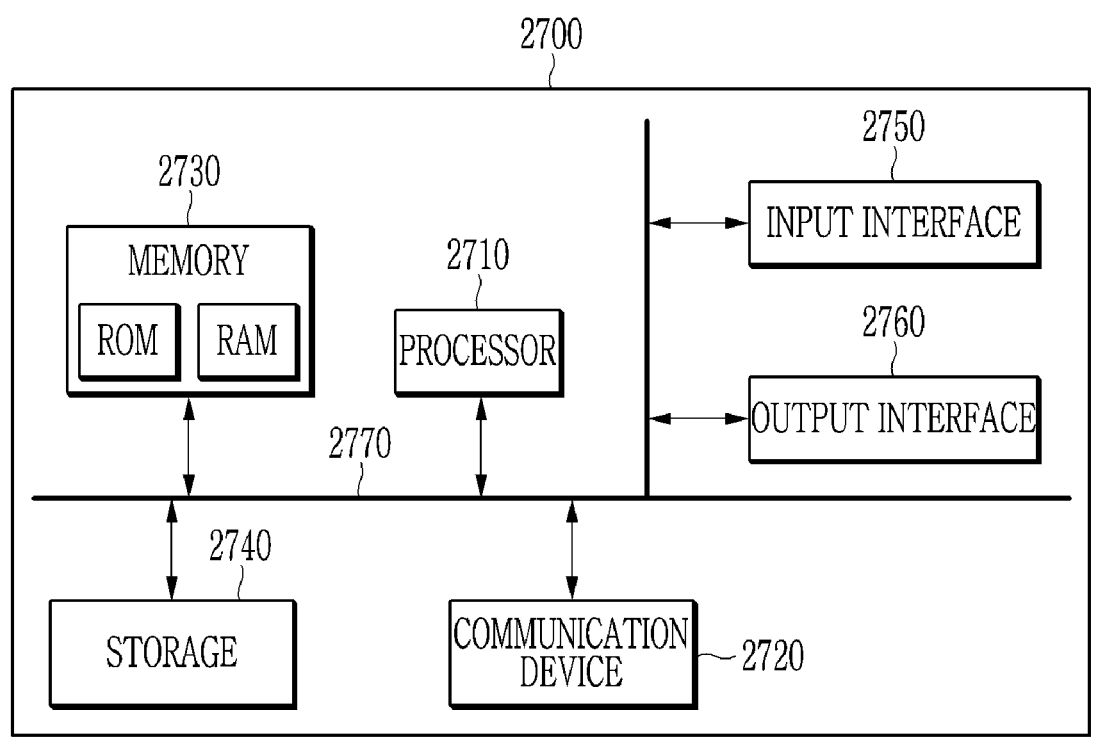
FIG. 27 is a block diagram illustrating an apparatus for predicting an attack vulnerability according to another exemplary embodiment.

FIG. 27 is a block diagram illustrating an attack vulnerability prediction apparatus according to another exemplary embodiment.

The apparatus for predicting an attack vulnerability according to an embodiment may be implemented as a computer system, for example, a computer-readable medium. Referring to FIG. 27, the computer system 2700 may include at least one of a processor 2710, a memory 2720, an input interface device 2750, an output interface device 2760, and a storage device 2740 communicating through a bus 2770. The computer system 2700 may also include a communication device 2720 coupled to the network. The processor 2710 may be a central processing unit (CPU) or a semiconductor device that executes instructions stored in the memory 2730 or the storage device 2740. The memory 2730 and the storage device 2740 may include various forms of volatile or nonvolatile storage media. For example, the memory may include a read only memory (ROM) or a random-access memory (RAM).

In the embodiment of the present disclosure, the memory may be located inside or outside the processor, and the memory may be coupled to the processor through various means already known. The memory is a volatile or nonvolatile storage medium of various types, for example, the memory may include a read-only memory (ROM) or a random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 2720 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments. On the contrary, it is intended to cover various modifications and equivalent arrangements included within the spirit and scope of the appended claims.

What is claimed is:

1. A method for predicting an attack vulnerability of a target computer network using a neural network model, the method comprising:
    collecting topology and asset information of a computer network which is created in a virtual environment;
    converting the topology and asset information into a training data set for training the neural network model;
    training the neural network model based on the training data set; and
    inferring the attack vulnerability of the target computer network using the trained neural network model,
    wherein
    the collecting topology and asset information of the computer network which is created in a virtual environment comprises:
    constructing a virtual topology of the computer network in the virtual environment;
    calculating a vulnerability score of each of a plurality of hosts included in the constructed virtual topology;
    generating a host connection matrix between the plurality of hosts; and
    generating an attack path table corresponding to the topology based on the host connection matrix and the vulnerability score of each of the plurality of hosts.

2. The method of claim 1, wherein
    the converting the topology and asset information into a training data set for training the neural network model comprises
    generating the training data set by preprocessing the host connection matrix, the asset information, and the attack path table.

3. The method of claim 2, wherein
    the generating the training data set by preprocessing the host connection matrix, the asset information, and the attack path table comprises
    generating host connection information based on a topology table on the topology and the host connection matrix.

4. The method of claim 3, wherein
    the generating the training data set by preprocessing the host connection matrix, the asset information, and the attack path table comprises
    generating asset connection information based on the asset information and the host connection matrix.

5. The method of claim 4, wherein
    the generating the training data set by preprocessing the connection matrix, the asset information, and the attack path table comprises
    generating attack path information corresponding to the topology based on the attack path table.

6. The method of claim 5, further comprising
    generating the training data set based on the host connection information, the asset connection information, and the attack path information.

7. The method of claim 1, wherein
    the inferring the attack vulnerability of the target computer network using the trained neural network model comprises:
    collecting topology and asset information of the target computer network;
    generating an input data set by pre-processing the topology and asset information of the target computer network; and
    inferring the attack vulnerability of the target computer network by using the neural network model trained based on the input data set.

8. An apparatus for predicting an attack vulnerability of a target computer network using a neural network model, the apparatus comprising:
    a processor and a memory, wherein the processor executes a program stored in the memory to perform:
    collecting topology and asset information of a computer network which is created in a virtual environment;
    converting the topology and asset information into a training data set for training the neural network model;
    training the neural network model based on the training data set; and
    inferring the attack vulnerability of the target computer network using the trained neural network model,
    wherein
    when the processor performs the collecting topology and asset information of the computer network which is created in a virtual environment, the processor performs:
    constructing a virtual topology of the computer network in the virtual environment;
    calculating a vulnerability score of each of a plurality of hosts included in the constructed virtual topology;
    generating a host connection matrix between the plurality of hosts; and
    generating an attack path table corresponding to the topology based on the host connection matrix and the vulnerability score of each of the plurality of hosts.

9. The apparatus of claim 8, wherein
    when the processor the converting the topology and asset information into a training data set for training the neural network model, the processor performs:
    generating the training data set by preprocessing the host connection matrix, the asset information, and the attack path table.

10. The apparatus of claim 9, wherein
    when the processor performs the generating the training data set by preprocessing the host connection matrix, the asset information, and the attack path table, the processor performs
    generating host connection information based on a topology table on the topology and the host connection matrix.

11. The apparatus of claim 10, wherein
    when the processor performs the generating the training data set by preprocessing the host connection matrix, the asset information, and the attack path table, the processor performs
    generating asset connection information based on the asset information and the host connection matrix.

12. The apparatus of claim 11, wherein
when the processor performs the generating the training data set by preprocessing the host connection matrix, the asset information, and the attack path table, the processor performs
generating attack path information corresponding to the topology based on the attack path table.

13. The apparatus of claim 12, wherein
the processor executes the program to further perform
generating the training data set based on the host connection information, the asset connection information, and the attack path information.

14. The apparatus of claim 8, wherein
when the processor performs the inferring the attack vulnerability of the target computer network using the trained neural network model, the processor performs:
collecting topology and asset information of the target computer network;
generating an input data set by pre-processing the topology and asset information of the target computer network; and
inferring the attack vulnerability of the target computer network by using the neural network model trained based on the input data set.

15. The apparatus of claim 8, further comprising:
a user interface to visualize the inferred attack vulnerability.

* * * * *